J. ALTMANN & M. GILGENBERG.
LUBRICATING AXLE.
APPLICATION FILED FEB. 20, 1912.
1,052,638.
Patented Feb. 11, 1913.
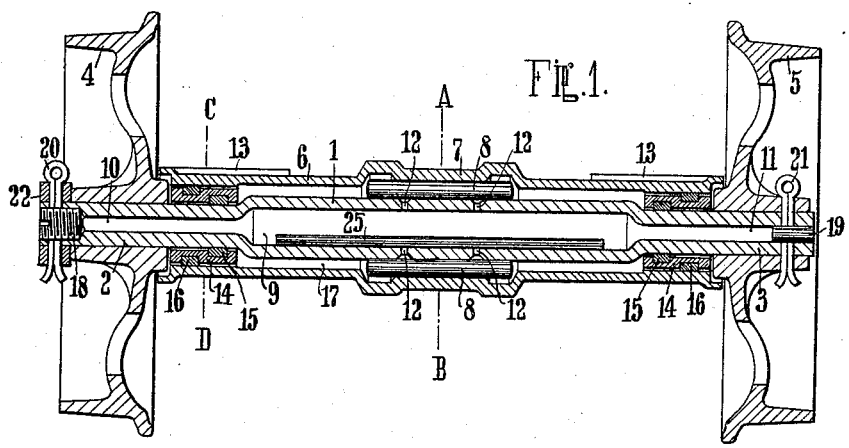
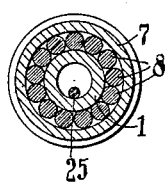
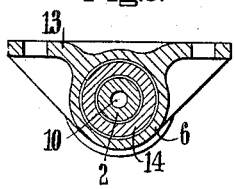

UNITED STATES PATENT OFFICE.

JOSEPH ALTMANN AND MARTIN GILGENBERG, OF KATTOWITZ, GERMANY.

LUBRICATING-AXLE.

1,052,638.  Specification of Letters Patent.  Patented Feb. 11, 1913.

Application filed February 20, 1912. Serial No. 678,937

*To all whom it may concern:*

Be it known that we, JOSEPH ALTMANN, merchant, a subject of the German Emperor, and residing at Emmastrasse 1, Kattowitz, in the Kingdom of Prussia, and MARTIN GILGENBERG, a subject of the German Emperor, and residing at Grünstrasse 17, Kattowitz, in the Kingdom of Prussia, Germany, have invented a new and useful Improvement in Lubricating-Axles, of which the following is a specification.

The present invention relates to wheels-sets for vehicles and mine-trucks in particular, in which a hollow axle for the reception of the lubricant is mounted in a through axle bushing or sleeve, which sleeve comprises at its middle a widened portion for the reception of the roller bearing.

The new feature of the invention consists in rings loosely mounted at both ends of the hollow axle. The inner surfaces of said rings are provided with felt rings, surrounding the axle, and the outer surfaces with rubber rings closely fitting within the sleeve. Hereby the advantage is obtained that the rings loosely mounted at both ends of the axle with the rubber rings on their outer surfaces do not rotate together with the axle and that therefore the rubber rings too, which are compressed in absorbing the shocks arising in working do not rotate against the sleeve, whereby wear of the rubber rings is prevented. The hollow axle might be reduced at its ends or possess equal diameter throughout its length. In this case the ends of the axle bushing are enlarged for the reception of the loosely mounted rings.

Referring to the drawing: Figure 1 is a longitudinal section through the sets of wheels. Fig. 2 is a section on the line A—B in Fig. 1. Fig. 3 is a section on the line C—D in Fig. 1.

The hollow axle 1 comprises at its ends spindles 2, 3 for the reception of the truck-wheels 4, 5. The axle is mounted in an axle bushing or sleeve 6 comprising at its middle a widened portion 7 for the reception of the roller bearing 8. The cavity in the axle serves for the reception of the lubricant, which is forced through the openings 10, 11 provided with covers at both ends of the axle into the cavity 9, and reaches the bearings 8 through the holes 12. Lugs 13 are provided at both ends of the sleeve 6 for mounting the sets of wheels on the vehicle frame or body.

In the enlarged ends of the axle-bushing 6 loosely mounted rings are mounted which are provided at their inner surfaces with felt rings 15 or rings of soft material and at their outer surfaces with rubber rings 16 or rings of another resilient material. The felt rings surround the hollow axle 1 while the rubber rings 16 closely fit in the ends of the axle-sleeve 6. By the felt rings 15 and the rubber rings 16 the space between axle 1 and sleeve 6 is shut off at both ends.

In normal operation the entire load is supported by the roller bearing (8). Only if shocks of the mine-trucks arise in working, the rubber rings 16 of the loosely mounted rings 14 are compressed in absorbing the shocks.

As the friction between the reduced portions of the axle 1 and the felt rings 15 is weaker than the friction between the rubber rings and the inner wall of the sleeve 6 the rings 14 with the rubber rings 16 will not rotate with the axle 1 against the sleeve 6. The consequence of this is, that the rubber rings 16 which have to absorb the above mentioned shocks will be saved for a very long time.

The hollow axle 1 is closed at one end by the screw plug 18 and at the other end by the cover 19. The screw plug 18 as well as the cover 19 are both secured in their position by slit-pins 20, 21 one of the slit pins 20 passing a collar 22 arranged before the hub of the wheel 4 and the other slit pin 21 passing the hub of the wheel.

In the cavity of the hollow axle 1 a rod 25 is loosely supported. During the rotation of the axle this rod 25 presses the lubricant through the openings 12. The lubricant used for this purpose is not in a liquid but in a viscous state.

We claim:

In sets of wheels for vehicles and mine trucks in particular, the combination of a hollow axle adapted for the reception of lubricant, a sleeve in which the hollow axle is mounted, a roller bearing, said sleeve comprising at its middle a portion for the reception of said roller bearing, rings loosely mounted at both ends of the axle, the inner surfaces of said rings being provided with rings of soft material and the outer surfaces of said rings with rings of resilient material, the interior rings surrounding said axle and the exterior rings closely fitting within the sleeve.

In testimony whereof we affix our signatures in presence of two witnesses.

JOSEPH ALTMANN.
MARTIN GILGENBERG

Witnesses:
 FRANK G. POTTS,
 ERNST KATZ.